US012767128B2

(12) United States Patent
Lewandowski et al.

(10) Patent No.: US 12,767,128 B2
(45) Date of Patent: Oct. 20, 2026

(54) LANE-BASED VEHICLE CONTROL

(71) Applicant: Ford Global Technologies, LLC, Dearborn, MI (US)

(72) Inventors: Andrew Denis Lewandowski, Sterling Heights, MI (US); Brendan Francis Diamond, Grosse Pointe, MI (US); Jordan Barrett, Milford, MI (US); Keith Weston, Canton, MI (US); Anthony Maraldo, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 17/821,220

(22) Filed: Aug. 22, 2022

(65) Prior Publication Data

US 2024/0059284 A1 Feb. 22, 2024

(51) Int. Cl.

*B60W 30/12* (2020.01)
*B60W 30/16* (2020.01)
*B60W 40/08* (2012.01)
*G06N 3/084* (2023.01)

(52) U.S. Cl.

CPC ............ *B60W 30/12* (2013.01); *B60W 30/16* (2013.01); *B60W 40/08* (2013.01); *G06N 3/084* (2013.01); *B60W 2530/203* (2020.02); *B60W 2540/043* (2020.02); *B60W 2540/049* (2020.02); *B60W 2554/402* (2020.02); *B60W 2554/406* (2020.02); *B60W 2555/20* (2020.02); *B60W 2556/10* (2020.02)

(58) Field of Classification Search

None

See application file for complete search history.

(56) References Cited

U.S. PATENT DOCUMENTS

| | | | | |
|---|---|---|---|---|
| 9,650,044 | B2 | 5/2017 | Kim | |
| 11,022,457 | B2 | 6/2021 | Fowe | |
| 11,613,269 | B2 * | 3/2023 | Wray | B60W 50/0098 701/27 |
| 12,110,026 | B2 * | 10/2024 | Carlson | B60W 10/20 |
| 2017/0124407 | A1 * | 5/2017 | Micks | G06V 40/20 |
| 2017/0225711 | A1 * | 8/2017 | DeCia | B62D 15/025 |
| 2018/0143033 | A1 * | 5/2018 | Hu | G01C 21/3617 |
| 2018/0215389 | A1 * | 8/2018 | Takae | B60R 21/00 |
| 2019/0011916 | A1 * | 1/2019 | Alvarez Rodriguez | B60R 1/26 |
| 2020/0293815 | A1 * | 9/2020 | Pfeifle | G06V 20/58 |
| 2020/0307589 | A1 * | 10/2020 | Li | B60W 60/0023 |
| 2021/0197858 | A1 * | 7/2021 | Zhang | G08G 1/161 |
| 2021/0245745 | A1 | 8/2021 | Wang | |
| 2021/0284162 | A1 | 9/2021 | Parks et al. | |
| 2022/0009520 | A1 * | 1/2022 | Lindholm | B60W 60/0025 |

(Continued)

FOREIGN PATENT DOCUMENTS

EP 3971859 A1 3/2022

*Primary Examiner* — Steven Vu Nguyen
*Assistant Examiner* — Melanie G Huber
(74) *Attorney, Agent, or Firm* — Frank A. Mackenzie; Brooks Kushman P.C.

(57) ABSTRACT

A vehicle can operate on a roadway for which a default lane is defined. Upon determining that the vehicle is currently operating on the roadway for which the default lane is defined, a lane override command to select a target lane other than the default lane can be determined based on prior lane selections in the vehicle. A vehicle component can be actuated based on the target lane override command.

20 Claims, 5 Drawing Sheets

(56) References Cited

U.S. PATENT DOCUMENTS

| | | | | |
|---|---|---|---|---|
| 2022/0080972 | A1 * | 3/2022 | Chen | B60W 30/16 |
| 2022/0083065 | A1 * | 3/2022 | Liu | B60W 60/0011 |
| 2022/0219701 | A1 * | 7/2022 | Chikamori | B60W 30/182 |
| 2023/0192074 | A1 * | 6/2023 | Abad | B60W 30/09 701/26 |
| 2023/0322234 | A1 * | 10/2023 | Wang | B60W 40/09 |
| 2024/0017726 | A1 * | 1/2024 | Abad | B60W 30/18163 |
| 2024/0025450 | A1 * | 1/2024 | Churay | B60W 30/18163 |

* cited by examiner

LANE-BASED VEHICLE CONTROL

BACKGROUND

Vehicles can operate in various autonomous or semi-autonomous modes in which one or more components such as a propulsion, a brake system, and/or a steering system of the vehicle are controlled by a vehicle computer. The Society of Automotive Engineers (SAE) has defined multiple levels of autonomous vehicle operation. At Levels 0-2, a human driver monitors or controls the majority of the driving tasks, often with no help from the vehicle. For example, at Level 0 ("no automation"), a human driver is responsible for all vehicle operations. At Level 1 ("driver assistance"), the vehicle sometimes assists with steering, acceleration, or braking, but the driver is still responsible for the vast majority of the vehicle control. At Level 2 ("partial automation"), the vehicle can control steering, acceleration, and braking under certain circumstances without human interaction. At Levels 3-5, the vehicle assumes more driving-related tasks. At Level 3 ("conditional automation"), the vehicle can handle steering, acceleration, and braking, as well as monitoring of the driving environment, under certain circumstances. Level 3 requires the driver to intervene occasionally, however. At Level 4 ("high automation"), the vehicle can handle the same tasks as at Level 3 but without relying on the driver to take over in certain driving modes. At Level 5 ("full automation"), the vehicle can handle almost all tasks without any driver intervention or even present.

Various existing systems that can operate at Level 1 or above include systems such as adaptive cruise control, which can control velocity of a vehicle, including by adapting the velocity of the ego vehicle to one or more other vehicles; lane-centering, in which vehicle steering is controlled to maintain a lateral position of a vehicle in the center of a lane of travel; and lane-changing, in which a vehicle steering, acceleration, and/or braking can be controlled to move a vehicle from one lane of travel to another. Such systems may be referred to as Advanced Driver Assistance Systems (ADAS). In some examples, an ADAS system can provide hands-free driving, and can control steering not only to maintain a vehicle in a lane of a roadway, but to change lanes.

DETAILED DESCRIPTION

Overview

A vehicle ADAS, referred to herein as a lane-control ADAS, can be provided to control vehicle steering, including to perform a lane change and/or lane-keeping (or maintenance) operation, without operator intervention or input. Typically, an operator input can be provided to override or cancel vehicle steering control including a lane change operation. Systems and methods disclosed herein include techniques to select a lane of travel on a roadway that increases usage and/or efficiency of an ADAS that controls a vehicle's lane of travel.

Figure 1:
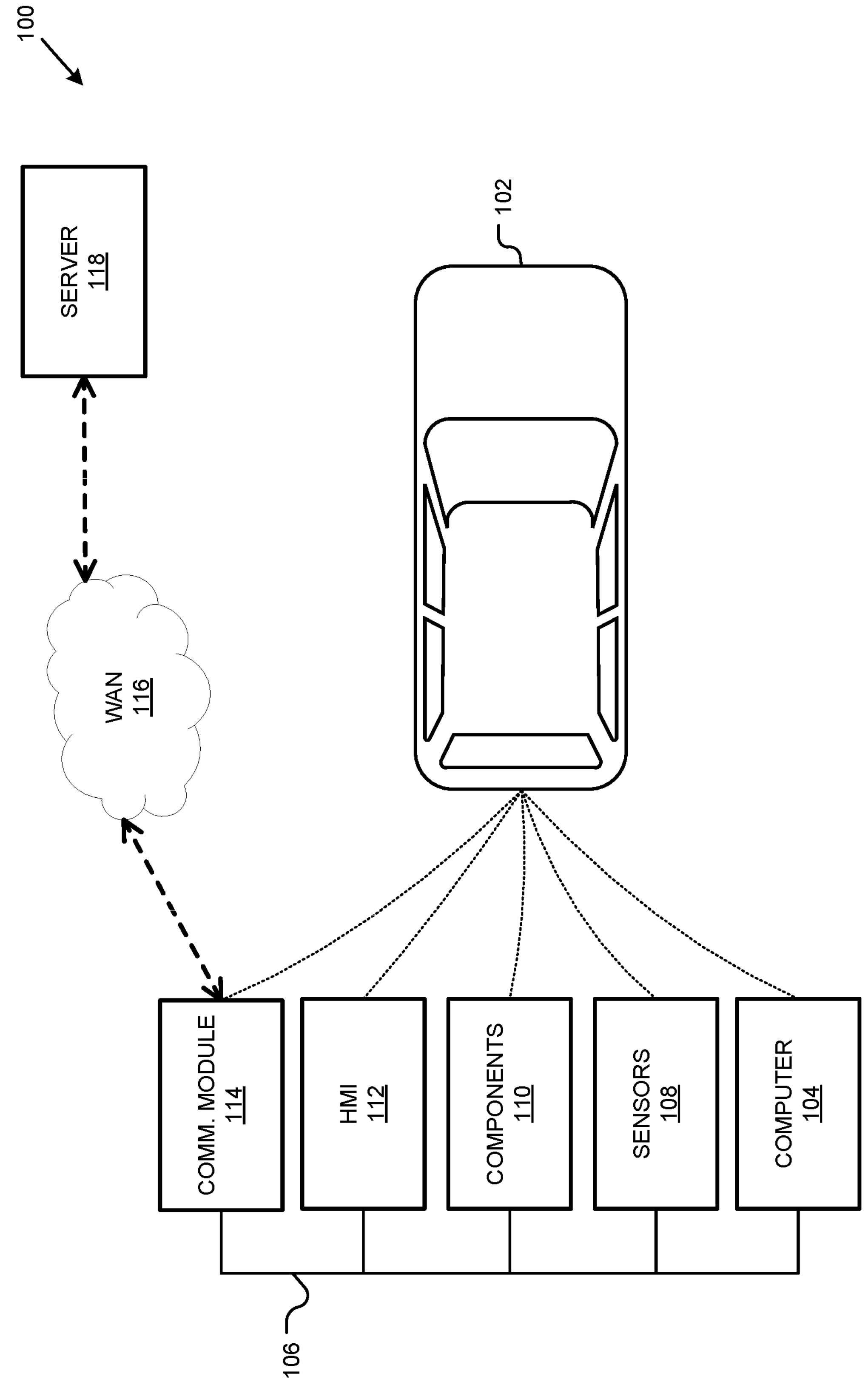
FIG. 1 is a block diagram of an example vehicle system.
Figure 2:
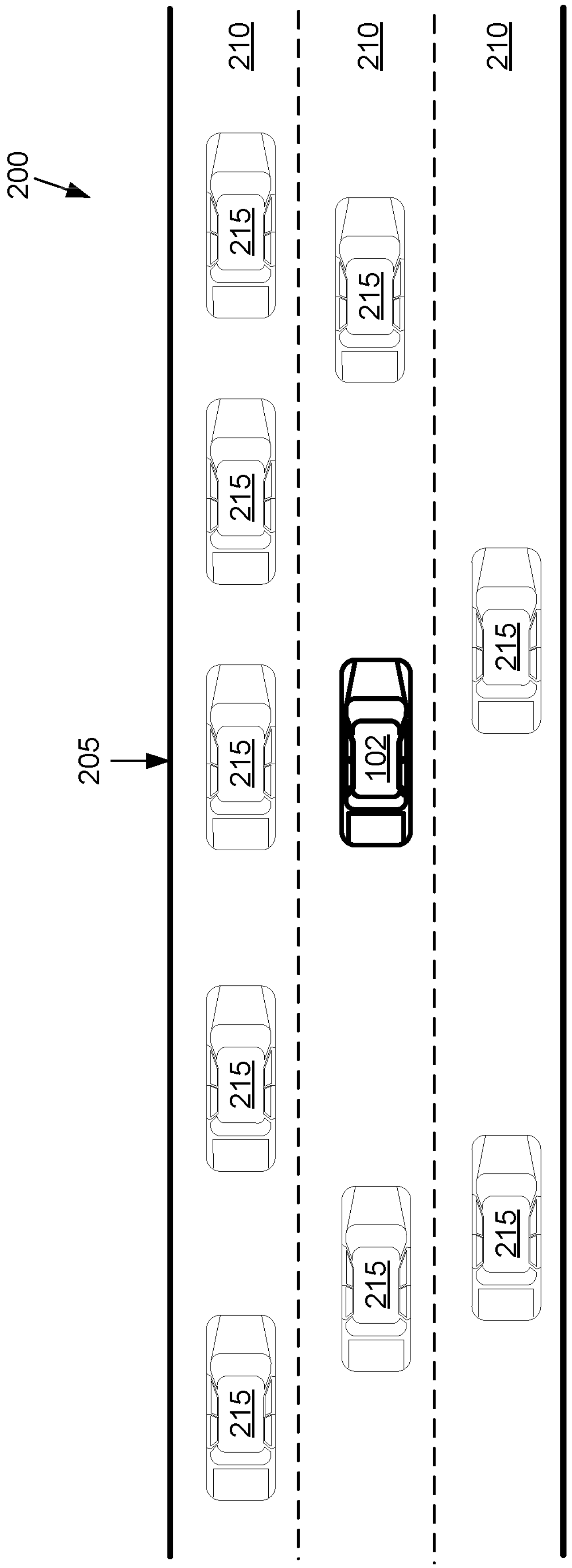
FIG. 2 is a diagram of an example traffic scene.

Referring initially to FIGS. 1 and 2, a vehicle system 100 includes a computer 104 including a processor and a memory. The memory stores instructions executable by the processor such that the computer 104 is programmed to determine that a vehicle 102 is currently operating on a roadway 205 for which a default travel lane 210 is defined. A default travel lane 210 is a travel lane 210 that a lane-control ADAS would select absent consideration of vehicle-specific factors as described herein. The computer 104 can further be programmed to, based on vehicle-specific factors such as prior travel lane 210 selections in the vehicle 102, determine a lane override command to select a target travel lane 210 other than the default travel lane 210. For example, as illustrated in the traffic scene 200 of FIG. 2 the vehicle 102 could be operating on (or in) a current travel lane 210 of a roadway 205, whereupon the lane-control ADAS determines that a second travel lane 210 is or has become the default travel lane 210. Alternatively, the ADAS could determine that the current travel lane 210 is a default travel lane 210. In either case, the vehicle computer 104 could determine a lane override command based on current vehicle 102 operating data to move the vehicle 102 to, or maintain the vehicle 102 in, a target travel lane 210 that could be the default travel lane 210 or could be a travel lane 210 other than the default travel lane 210. Further, the vehicle computer 104, based on a travel lane 210 that is selected based on the lane override command, could actuate (i.e., command actuation of) a vehicle component 110 such as propulsion, braking, and/or steering, and/or a vehicle 102 HMI 112, e.g., to move the vehicle 102 to, or maintain the vehicle 102 in, the target travel lane 210.

The vehicle computer 104 can be programmed to generate or determine the lane override command according to a classifier such as a trained neural network. The classifier can be trained with vehicle 102 operating data including vehicle-specific factors, and/or operator-specific factors, for selecting a target travel lane 210, to generate or determine the lane override command. For example, the classifier could take as input vehicle 102 operating data and available target travel lanes 210 at a current vehicle 102 location and/or at various points along a vehicle 102 route, and then could output a target travel lane 210. The computer 104 can then determine whether the target travel lane 210 and the default travel lane 210 are the same or different. The target lane override command can be determined or generated when the target and the default travel lane 210 are different, whereupon the computer 104 can actuate one or more vehicle components to move the vehicle 102 to or maintain the vehicle 102 and the target travel lane 210 (rather than the default travel lane 210).

Accordingly, the present disclosure includes a system comprising a computer including a processor and a memory, the memory storing instructions executable by the processor such that the computer is programmed to determine that a vehicle is currently operating on a roadway for which a default lane is defined; based on prior lane selections in the vehicle, determine a lane override command to select a target lane other than the default lane; and actuate a vehicle component based on the target lane override command.

The default lane can be determined based on a specified current vehicle route. The target lane can be determined based on a specified current vehicle route. Determining the target lane based on the specified current vehicle route can include determining the target lane based on a landmark along the specified current vehicle route.

The lane override command can be further based on vehicle occupant data. The vehicle occupant data can include a number of vehicle occupants, a detected occupant activity, and/or a detected occupant identity.

The lane override command can be further based on data about a second vehicle detected by a sensor in the first vehicle. The data about the second vehicle can include a relative distance and/or a relative speed of the vehicle from the second vehicle. The data about the second vehicle can include a type of the second vehicle.

The lane override command can be further based on a detected light intensity. The lane override command can be further based on a detected traffic density. The lane override command can be further based on a trailer being towed by the vehicle. The lane override command can be further based on a cargo load of the vehicle.

The instructions to actuate the vehicle component include instructions to actuate one or more of propulsion, braking, steering, or a human machine interface.

The lane override command can be based on output from a machine learning program. The machine learning program can be trained based on user input overriding a driver assistance feature. The machine learning program can be trained based on data collected while the vehicle is manually operated on the roadway.

A method comprises determining that a vehicle is currently operating on a roadway for which a default lane is defined; based on prior lane selections in the vehicle, determining a lane override command to select a target lane other than the default lane; and actuating a vehicle component based on the target lane override command.

Example System

As mentioned above, a vehicle system 100 includes elements of a lane-control ADAS including a computer 104 that includes a processor and a memory. The memory includes one or more forms of computer 104 readable media, and stores instructions executable by the vehicle computer 104 for performing various operations, including as disclosed herein. For example, a vehicle computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 108 data and/or communicating the sensor 108 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 110 inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers 118, or any volatile or non-volatile media. The memory can store the collected data sent from the sensors 108. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus as described further below, more than one processor, e.g., included in components 110 such as sensors 108, electronic control units (ECUs) or the like included in the vehicle 102 for monitoring and/or controlling various vehicle components, e.g., a powertrain controller, a brake controller, a steering controller, etc.

The computer 104 is generally arranged for communications on a vehicle network 106 that can include a communications bus in the vehicle 102 such as a controller area network CAN or the like, and/or other wired and/or wireless mechanisms. The vehicle network 106 is a communications network via which messages can be exchanged between various devices, e.g., sensors 108, components 110, computer 104(*s*), etc. in vehicle 102. The computer 104 can be generally programmed to send and/or receive, via vehicle network 106, messages to and/or from other devices in vehicle 102 e.g., any or all of ECUs, sensors 108, actuators, components 110, communications module, a human machine interface (HMI), etc. For example, various component 110 subsystems (e.g., components 110 can be controlled by respective ECUs) and/or sensors 108 may provide data to the computer 104 via the vehicle 102 communication network. Further, in cases in which computer 104 actually comprises a plurality of devices, the vehicle network 106 may be used for communications between devices represented as computer 104 in this disclosure. For example, vehicle network 106 can include a controller area network CAN in which messages are conveyed via a CAN bus, or a local interconnect network LIN in which messages are conveyed via a LIN bus. In some implementations, vehicle network 106 can include a network in which messages are conveyed using other wired communication technologies and/or wireless communication technologies e.g., Ethernet, WiFi, Bluetooth, etc. Additional examples of protocols that may be used for communications over vehicle network 106 in some implementations include, without limitation, Media Oriented System Transport MOST, Time-Triggered Protocol TTP, and FlexRay. In some implementations, vehicle network 106 can represent a combination of multiple networks, possibly of different types, that support communications among devices in vehicle 102. For example, vehicle network 106 can include a CAN in which some devices in vehicle 102 communicate via a CAN bus, and a wired or wireless local area network in which some device in vehicle 102 communicate according to Ethernet or Wi-Fi communication protocols.

The vehicle 102 typically includes a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system GPS sensors 108; accelerometers such as piezo-electric or microelectromechanical systems MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Sensor 108 operation can be affected by obstructions, e.g., dust, snow, insects, etc. Often, but not necessarily, a sensor 108 includes a digital-to-analog converter to converted sensed analog data to a digital signal that can be provided to a digital computer 104, e.g., via a network. Sensors 108 can include a variety of devices, and can be disposed to sense and environment, provide data about a machine, etc., in a variety of ways. For example, a sensor 108 could be mounted to a stationary infrastructure element on, over, or near a road. Moreover, various controllers in a vehicle 102 may operate as sensors 108 to provide data via the vehicle network 106 or bus, e.g., data relating to vehicle 102 speed, acceleration, location, subsystem and/or component 110 status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component 110, a location of an object, a speed of an object, a type of an object, a slope of a roadway 205, a temperature, an presence or amount of moisture, a fuel level, a data rate, etc.

The computer 104 may include programming to command one or more actuators to operate one or more vehicle 102 subsystems or components 110, such as vehicle 102 brakes, propulsion, or steering. That is, the computer 104 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 106, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle 102 can include an HMI 112 (human-machine interface), e.g., one or more of a display, a touchscreen display, a microphone, a speaker, etc. The user can provide input to devices such as the computer 104 via the HMI 112. The HMI 112 can communicate with the computer 104 via the vehicle network 106, e.g., the HMI 112 can send a message including the user input provided via a touchscreen, microphone, a camera that captures a gesture, etc., to a computer 104, and/or can display output, e.g., via a screen, speaker, etc.

The computer 104 may be configured for communicating via a vehicle 102 to vehicle 102 communication module 114 or interface with devices outside of the vehicle 102, e.g., through a wide area network 116 and/or vehicle 102 to vehicle 102 V2V, vehicle-to-infrastructure or everything V2X or vehicle-to-everything including cellular communications C-V2X wireless communications cellular, DSRC., etc. to another vehicle 102, to an infrastructure element typically via direct radio frequency communications and/or typically via the network a remote server 118. The module could include one or more mechanisms by which the computers 104 of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

A computer 104 can be programmed to communicate with one or more remote sites such as a remote server 118, via a wide area network 116. The wide area network 116 can include one or more mechanisms by which a vehicle computer 104 may communicate with, for example, a remote server 118. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X CV2X, Dedicated Short Range Communications DSRC, etc., local area networks and/or wide area networks 116, including the Internet, providing data communication services.

The server 118 may include one or more computing devices, e.g., having respective processors and memories and/or associated data stores, that are accessible via the wide area network 116.

Example Operations

Referring now to FIG. 2, computer 104 can be programmed to determine a lane override command for a vehicle 102 to select a target travel lane 210, and prior selections of travel lanes 210 on a roadway and/or at locations along the route. For example, the target traveling 210 could be selected from a plurality of travel lanes 210 on a roadway 205 as a travel lane 210 other than a default travel lane 210. For example, with reference to FIG. 2, a default travel lane could be a current travel lane 210 in which the vehicle is traveling, i.e., the middle travel lane 210 shown on the roadway 205 of FIG. 2. Potential target lanes would then be the lanes to the left and right of the default travel lane 210. Alternatively, a default travel lane 210 could be a lane in which the vehicle 102 is not currently traveling, e.g., in FIG. 2, either of the travel lanes 210 adjacent to the travel lane 210 in which the vehicle 102 is currently traveling. In this case, the current travel lane 210 of the vehicle 102 would be a potential target travel lane 210. Various vehicle 102 operating data can be input to a classifier, i.e., used to determine the target travel lane 210, and hence, the lane override command. Training and operation of the classifier is described further below.

The default travel lane 210 can be determined based on a specified current route and/or location of the vehicle 102. For example, a user could input a route that is received by the vehicle computer 104, and/or the vehicle computer 104 could determine or predict a route of the vehicle 102, e.g., based on a location, time of day, day of week, etc. Further, based on the route and the current vehicle 102 location, the computer 104 could then determine the default travel lane 210 based on one or more factors. For example, the computer 104 could be programmed to place or maintain the vehicle 102 in a lane closest to an exit ramp or that is a lane for an upcoming turn, e.g., when the vehicle 102 is within a predetermined distance of the exit ramp or turn, e.g., 1 mile. Alternatively or additionally, when the vehicle 102 enters a roadway 205 and a route specifies that the vehicle 102 is to turn or exit within a predetermined distance of entering, e.g., 2 miles, 3 miles, etc., the computer 104 could be programmed to maintain or place the vehicle 102 in a target travel lane closest to the exit ramp or turn lane. Yet further, the computer could be programmed to place or maintain the vehicle 102 in a travel lane 210 based on a traffic density predicted for the route and/or for specific travel lanes 210 on the route. For example, if a first travel lane 210 of a roadway 205 has a higher traffic density than a second lane of the roadway 205, and the specified route does not require the vehicle 102 to be in the higher traffic density lane (because that lane is occupied by vehicles 102 making a turn or taking an exit that the ego vehicle 102 is not taking), then the computer 104 may determine to place or maintain the vehicle 102 in the lower traffic density lane based on the route data. Yet further, route data could be used in combination with data about travel lanes 210 affected by construction, roadway 205 damage (e.g., potholes or bumps), etc., to select a default travel lane 210.

A target travel lane 210 to which a vehicle can be directed to move according to a lane override command can be determined based on the specified current route of the vehicle 102, and prior travel lane 210 selections along that current route. As explained further below, the classifier could be trained, based on a specified route, location, and/or time of day and/or day of week, etc., to select a target travel lane 210 of a roadway 205. The training could be based on operator inputs or selections of a travel lane 210 along a route and/or at a location, etc. For example, training could indicate a user preference for a lane of travel other than a turn lane even when the vehicle 102 is on a certain roadway 205 for less than a threshold distance under which the computer 104 would select the turn lane as a default travel lane 210. In another example, training could indicate a user preference for a lane of travel to allow the vehicle 102 to access a landmark such as a refueling station.

The vehicle 102 operating data that is provided to determine the target travel lane 210, and hence the lane override command, could further include vehicle 102 occupant data, i.e., occupant data at a time when a travel lane 210 selection was made could be taken into account. A number and/or respective identities of vehicle 102 operators could be determined via a variety of mechanisms. For example, vehicle 102 occupants could be associated with portable devices, e.g., smart phones or the like, that could be detected and identified by a vehicle computer 104, e.g., via Bluetooth or the like. Alternatively or additionally, vehicle 102 sensors 108, such as one or more cameras disclosed in a vehicle 102 cabin, could detect a number and/or identities (e.g., using facial recognition or other biometric identification) of vehicle 102 occupants. Yet further, vehicle 102 occupant data could include an activity at a given time. For example, the vehicle computer 104 could detect a usage of user device and/or occupant input to a vehicle 102 HMI 112. Yet further, vehicle 102 occupant data could include in occupant state, i.e., a physical condition of the occupant, such as whether the occupant is asleep or awake as indicated by camera sensor 108 data.

The vehicle 102 operating data taken into account for evaluating prior travel lane 210 selections could further include data about one or more second vehicles 215, e.g., detected by a sensor 108 in the first vehicle 102, indicated in data received via V2X communications, etc. For example, the vehicle computer 104 could obtain data, e.g., by detecting second vehicles 215 using conventional object detection techniques, by receiving data from a traffic infrastructure system via V2X communications, etc., indicating relative traffic densities and respective travel lanes 210. A traffic density is a number of vehicles 102 per unit distance along a length of a travel lane 210 of a roadway 205, e.g., a number of vehicles 102 per kilometer. The computer 104 can determine the traffic density of the road based on sensor 108 data, for example. Based on a number of second vehicles 215 detected by vehicle 102 sensors 108 in a travel lane 210, the computer 104 can then count the number of second vehicles 215 traveling in the travel lane 210, and divide that number by the length of the section of the road. The computer 104 can determine the length of the section based on fields of view of the sensors 108, e.g., stored in a memory of the first computer 104. As another example, the computer 104 can receive the traffic density of the road from a remote server 118, e.g., via the wide area network 116 and/or V2X communications. In general, as traffic density increases, average speed of traffic remains constant until the traffic density reaches a saturation point, which is defined as a traffic density beyond which the speed of traffic i.e., average speed of vehicles 102 at a point on a road decreases. The saturation point typically depends on the number of lanes of traffic in a direction and can be determined experimentally by observing the road over time, i.e., by gathering empirical data. The saturation point is a predetermined quantity for a given road, direction, and number of lanes in that direction. The saturation point can be experimentally, i.e., empirically, determined by making many observations of the number of vehicles 102 on the road and the speeds of the vehicles 102, from which traffic density and average speed can be calculated. Accordingly, a traffic density and/or the traffic density reaching a saturation point in a default travel lane 210 could be input to a classifier along with a traffic density and/or whether the traffic density had reached a saturation point in a potential target travel lane 210, for determining the target lane override command.

As an alternative, or in addition, to traffic density, input to the classifier could include a relative distance and/or a relative speed of the vehicle 102 from one or more second vehicles 215 when a prior travel lane 210 selection was made. For example, if a second vehicle 215 is within a specified distance of the vehicle 102 at over a specified speed, e.g., is "tailgating," then the second vehicle 215 being within these distance and/or speed thresholds could be input for determining a target travel lane 210 even when a current lane is the default travel lane 210. Similarly, a type of a second vehicle 215 in a default travel lane 210 and/or potential target travel lanes 210 could be input to the classifier. A type of vehicle 102 herein means a categorization of the vehicle 102 according to size and/or weight or mass. Example vehicle 102 to include tractor-trailer, heavy-duty truck, light-duty truck, sedan, sport-utility vehicle 102 (large), sport-utility vehicle 102 (medium), etc. For example, a user may have provided input used in training the classifier to avoid lanes where the vehicle 102 will be traveling immediately behind and/or head of a tractor-trailer.

Another possible input to the classifier is a detected light intensity. For example, vehicle 102 sensors 108 could detect light emitted by a second vehicle 215 immediately behind the vehicle 102, and determine that a measurement of the detected light (e.g., in lumens) exceeded a threshold. Alternatively or additionally, vehicle 102 sensors 108 could detect light and oncoming lane of travel, e.g., exceeding a threshold. The detected light measurements, or the fact that the measurement exceeded the threshold could be input to the classifier, which could select a target travel lane 210 based on determining a travel lane 210 less likely to result in light intensity measured at the vehicle 102 exceeding the threshold.

Another possible input to the classifier is a type and/or amount of cargo carried and/or towed by the vehicle 102. For example, the computer 104 could detect, e.g., with a vehicle 102 camera sensor 108 or radar sensor 108, or could receive input indicating, that a trailer is being towed by the vehicle 102. Alternatively or additionally, the computer 104 could receive input about a weight of cargo, that cargo is being carried on a vehicle 102 roof, etc. Yet further, the computer 104 could detect a cargo or trailer load based on a deflection of a vehicle 102 suspension. Data about the type and/or amount of cargo could indicate that a vehicle 102 should select a target travel lane 210 in which a lower speed can be maintained, in which a shoulder of a roadway 205 is available, etc.

As mentioned above, based on the lane override command, the computer 104 can provide a command or instruction to actuate one or more vehicle components, such as one or more of propulsion, braking, steering, or an HMI 112. That is, based on the lane override command the computer 104 can determine that the vehicle 102 should remain in a current travel lane 210, or that the vehicle 102 should move to a different travel lane 210 than the current travel lane 210. As mentioned above, various vehicle 102 ADAS systems can implement such commands.

Classifier

Figure 3:
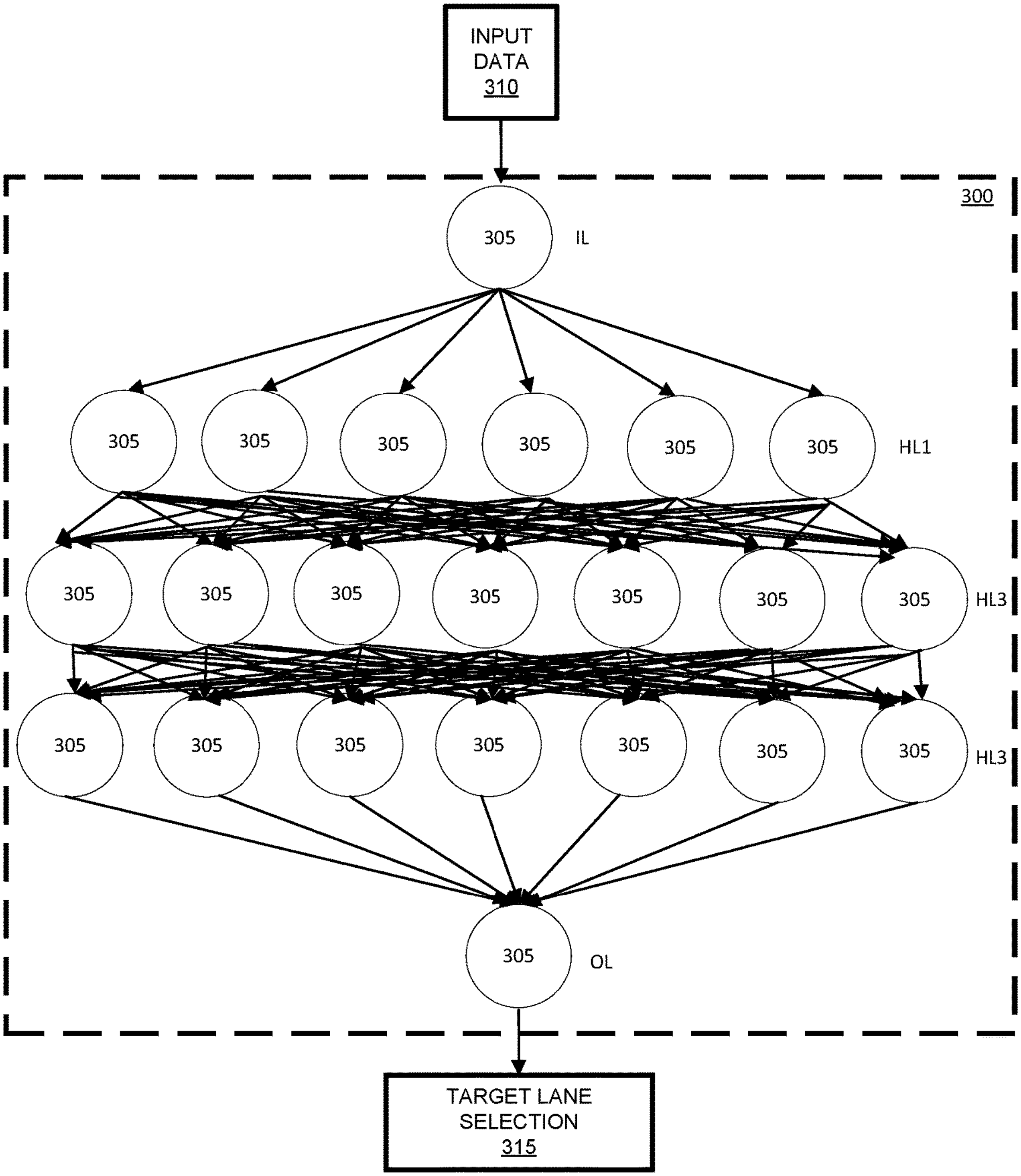
FIG. 3 illustrates an exemplary deep convolutional neural network (CNN).

The classifier that outputs the target travel lane 210 override command can be implemented in any suitable manner, e.g., based on Principal Components 110 Analysis (PCA) or a machine learning program such as a neural network. FIG. 3 illustrates an exemplary deep convolutional neural network (CNN) that could be implemented as a classifier to output the target travel lane 210 override command.

The CNN 300 includes multiple nodes 305, sometimes referred to as neurons because they are designed to be analogous to neurons in an animal brain. The nodes 305 are arranged so that the CNN 300 includes an input layer IL, one or more hidden layers HL1, HL2, HL3, and an output layer OL. Each layer of the CNN 300 can include a plurality of nodes 305. While FIG. 2 illustrates two hidden layers, it is understood that the CNN 300 can include additional or fewer hidden layers. The input and output layers for the CNN 300 are shown with respective single nodes 305 for ease of illustration, but could include a plurality of input or output nodes 305, respectively. A set of inputs (represented by the arrows) to each node 305 can be each multiplied by respective weights. The weighted inputs can then be summed in an input function to provide, possibly adjusted by a bias, a net input. The net input can then be provided to an activation function, which in turn provides a connected node 305 an output. The activation function can be a variety of suitable functions, typically selected based on empirical analysis. As illustrated by the arrows in FIG. 3, node 305 outputs can then be provided for inclusion in a set of inputs to one or more nodes 305 in a next layer.

In implementations based on the present disclosure, a CNN 300 can be trained to accept vehicle 102 operating data, including one or more data described above, as input data 310, and provide as output a target lane selection 315. The CNN 300 can be trained with vehicle 102 operating data. For example, a vehicle 102 could be put in a training mode, in which the vehicle 102 would travel a route. The vehicle 102 could be manually operated by an occupant and/or some operations could be performed by the computer 104, e.g., in ADAS that controlled vehicle 102 steering, including lane selection could be used during training. During the data collection process, vehicle 102 operating data could be recorded, including user input such as controlling a vehicle 102 to override in ADAS lane decision and/or user input, e.g., to a vehicle HMI 112, rating an ADAS lane decision, e.g., as either good or bad. The data can then be used to train the CNN 300. In training, weights can be initialized by using a Gaussian distribution, for example, and a bias for each node 305 can be set to zero. Training the CNN 300 can include updating weights and biases via suitable techniques such as back-propagation with optimizations, whereby the trained CNN 300 outputs lane selections that represent desired target travel lanes 210 within a specified degree of confidence.

Processes

Figure 4:
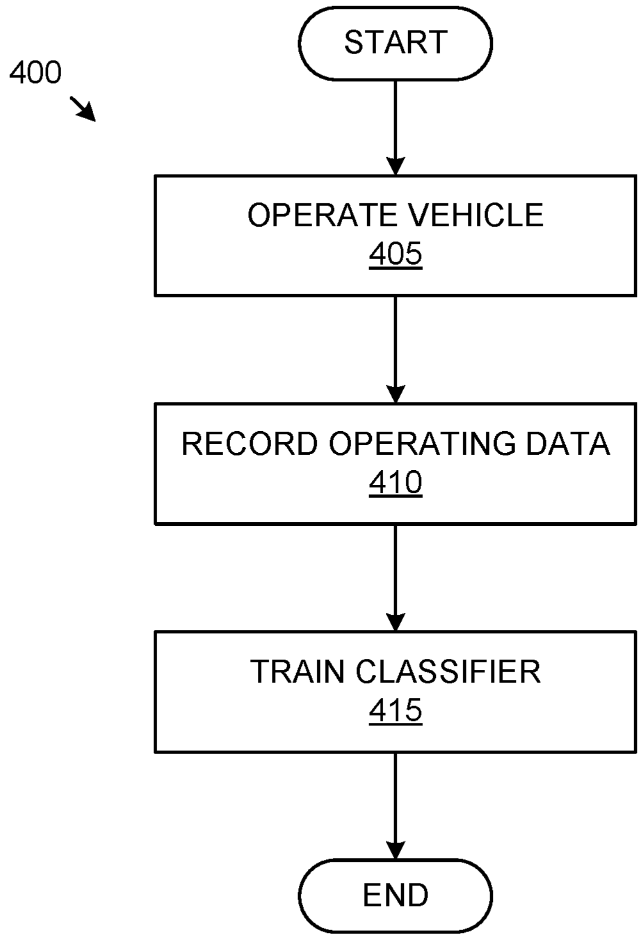
FIG. 4 illustrates an example process for training a CNN to output lane selections.

FIG. 4 illustrates an example process 400 for training a CNN 300 to output lane selections. As just stated, the vehicle computer 104 may receive input to initiate a training mode and/or may be programmed to perform training, e.g., when a vehicle 102 is being used below a specified mileage, i.e., is newly acquired.

The process 400 begins in a block 405, in which a vehicle 102 is operated along a route and/or at a set of locations.

Next, and a block 410, the vehicle computer 104 records to vehicle 102 operating data. The operating data can include a variety of operating data such as described above, including traveling 210 selections at a location, along the route, and a time of day, day of week, etc., Along with other vehicle 102 operating data. The operating data is associated with timestamps and/or locations.

Next, in a block 415, the CNN 300 is trained with the operating data to output lane selections. Following the block 415, the process 400 ends.

Figure 5:
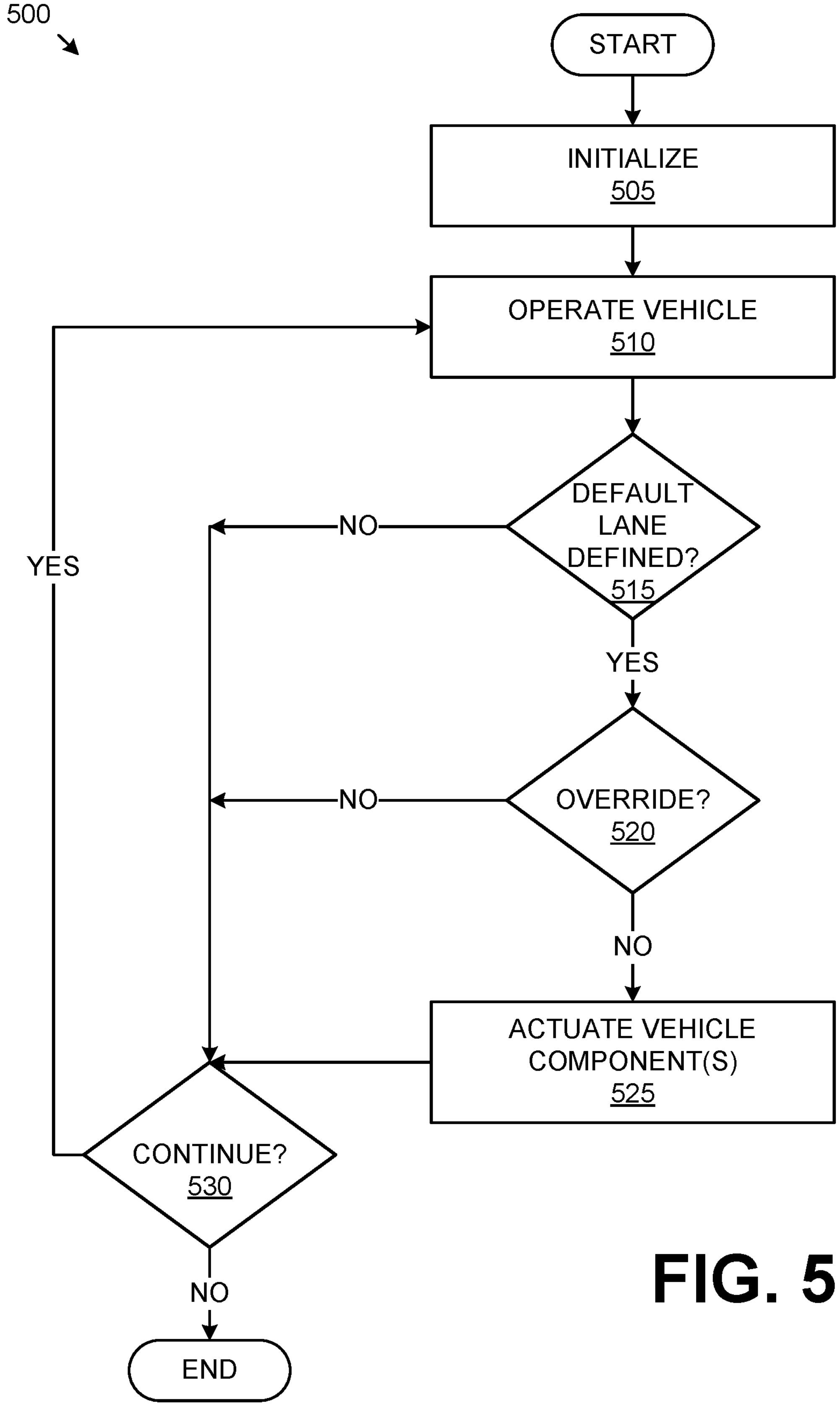
FIG. 5 illustrates an example process for operating a vehicle system.

FIG. 5 illustrates an example process 500 for operating a vehicle system 100 including a computer 104 and vehicle components 110 to carry out target lane selection 315 and implementation of lane override commands.

The process 500 begins in a block 505, in the vehicle computer 104 initializes the target lane selection 315 and lane override command process upon detecting activation of an ADAS that is configured to determine a default travel lane 210, and to move the vehicle 102 to, or maintain the vehicle 102 in, the default travel lane 210. For example, the computer 104 could detect the ADAS being activated when a vehicle 102 is powered on, or at some later time. The initialization block 505 typically includes instantiating data structures and establishing communications with vehicle sensors 108 to provide vehicle 102 with operating data. The initialization block 505 may further include receiving input specifying a route of the vehicle 102, e.g., based on user input, based on a user's typical routes for a time of day, day of week, etc.

Next, in a block 510, the vehicle 102 is operated. That is, the vehicle 102 travels on a roadway 205, possibly along a specified (e.g., user-input or determined by the computer 104 based on a day of week, location, and/or time of day) route over one or more or roadways 205.

Next, in a black 515, the computer 104 determines whether a default travel lane 210 is defined. In some situations, even if a lane-control ADAS is activated, the ADAS may not determine a default travel lane 210. For example, if the vehicle 102 is operating on a roadway 205 with only one available travel lane 210 in a direction of travel, the ADAS may not determine a default travel lane 210. If no default travel lane 210 is defined, then the process 500 proceeds to a block 530. If a default travel is defined, then the process 500 proceeds to a block 520.

In the black 520, the computer 104 determines whether to output the target travel lane 210 override command. That is, the computer 104 can input vehicle 102 operating data as described above to a classifier as described above to output a target lane selection 315. If the target travel lane 210 and the default travel lane 210 are not a same lane, then the computer 104 can output the target travel lane 210 override command, including a specification of the target travel lane 210, to a lane-control ADAS, and the block 525 is executed next. If the target travel lane 210 in the default travel lane 210 are the same lane, then the process 500 can proceed to the block 530.

In the block 525, the lane-control ADAS actuate one or more vehicle components to move the vehicle 102 to, or maintain the vehicle 102 in, the target travel lane 210. Following the black 525, the process 500 proceeds to the block 530.

In the block 530, the computer 104 determines whether the process 500 should continue. For example, a vehicle 102 may exit a route and/or a geo-fenced area in which the process 500 is to be executed, the vehicle 102 may be powered off, or a user could provide input to deactivate the process 500. If the process 500 is determined to continue, the process 500 returns to the block 510. Otherwise, the process 500 ends following the block 530.

Conclusion

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship. For example, the statement "A is based on B" means that A not only follows B and time, but is a result at least in part of B. Further, unless explicitly stated otherwise, "based on" includes partly based on in addition to completely based on. Put another way, "based on," unless explicitly stated otherwise, means "based at least in part on."

The invention claimed is:

1. A system comprising a computer including a processor and a memory, the memory storing instructions executable by the processor such that the computer is programmed to:

determine that a vehicle is currently operating on a roadway for which a default lane is defined;

based on prior lane selections in the vehicle, vehicle operating data from respective times of the prior lane selections, and vehicle occupant data that includes current vehicle occupant data and vehicle occupant data from the prior lane selections, wherein the vehicle occupant data comprises vehicle occupant identities or occupant activities associated with respective prior lane selections, determine a lane override command to select a target lane other than the default lane, wherein the vehicle operating data from respective times of the prior lane selections includes relative distances and/or relative speeds of the vehicle from one or more second vehicles when the respective prior lane selections were made; and actuate a vehicle component based on the target lane override command.

2. The system of claim 1, wherein determining the target lane includes determining the target lane based on a landmark along the current vehicle route.

3. The system of claim 1, wherein the vehicle occupant data include a number of vehicle occupants.

4. The system of claim 1, wherein the vehicle occupant data include a detected occupant activity.

5. The system of claim 1, wherein the vehicle occupant data include a detected occupant identity.

6. The system of claim 1, wherein the instructions include instructions to determine the lane override command further based on data about a second vehicle detected by a sensor in the first vehicle.

7. The system of claim 6, wherein the data about the second vehicle include a relative distance and/or a relative speed of the vehicle from the second vehicle.

8. The system of claim 6, wherein the data about the second vehicle include a type of the second vehicle.

9. The system of claim 1, wherein the instructions include instructions to determine the lane override command further based on a detected light intensity.

10. The system of claim 1, wherein the instructions include instructions to determine the lane override command further based on a detected traffic density.

11. The system of claim 1, wherein the instructions include instructions to determine the lane override command based on a trailer being towed by the vehicle.

12. The system of claim 1, wherein the instructions include instructions to determine the lane override command based on a cargo load of the vehicle.

13. The system of claim 1, wherein the instructions to actuate the vehicle component include instructions to actuate one or more of propulsion, braking, steering, or a human machine interface.

14. The system of claim 1, wherein the lane override command is based on output from a machine learning program that was trained with the prior lane selections and the vehicle operating data from the respective times of the prior lane selections.

15. The system of claim 14, wherein the machine learning program is trained based on user input overriding a driver assistance feature.

16. The system of claim 14, wherein the machine learning program is trained based on data collected while the vehicle is manually operated on the roadway.

17. The system of claim 1, wherein the target lane and/or the default lane is specified based on a current vehicle route that includes a vehicle turn or exit from the roadway within a predetermined distance.

18. A method, comprising:

determining that a vehicle is currently operating on a roadway for which a default lane is defined;

based on prior lane selections in the vehicle, vehicle operating data from respective times of the prior lane selections, and vehicle occupant data that includes current vehicle occupant data and vehicle occupant data from the prior lane selections, wherein the vehicle occupant data comprises vehicle occupant identities or occupant activities associated with respective prior lane selections, determining a lane override command to select a target lane other than the default lane, wherein the vehicle operating data from respective times of the prior lane selections includes relative distances and/or relative speeds of the vehicle from one or more second vehicles when the respective prior lane selections were made; and actuating a vehicle component based on the target lane override command.

19. The method of claim 18, wherein determining the target lane includes determining the target lane based on a landmark along the current vehicle route.

20. The method of claim 18, wherein the target lane and/or the default lane is specified based on a current vehicle route that includes a vehicle turn or exit from the roadway within a predetermined distance.

* * * * *